Dec. 31, 1957 P. R. WEIHSMANN 2,818,273
MOTOR VEHICLE WITH VARIABLE GROUND CLEARANCE
SUSPENSION SENSITIVE TO SPEED
Filed Aug. 23, 1956 2 Sheets-Sheet 1
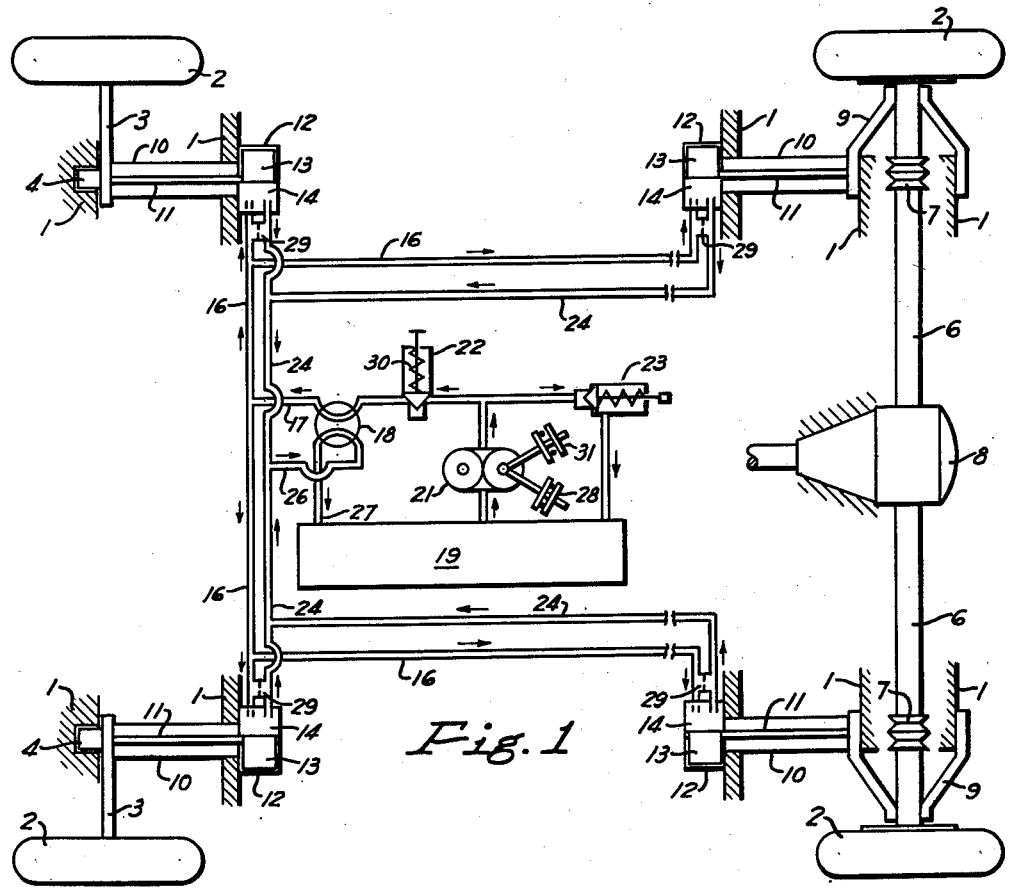
Fig. 2
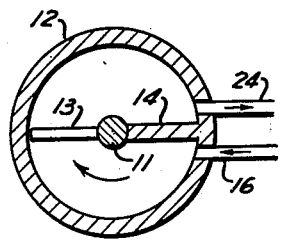
Fig. 3
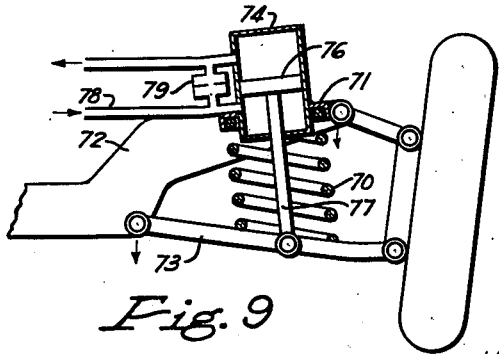
Fig. 9
INVENTOR.
PETER R. WEIHSMANN
BY
Brown, Critchlow, Flick & Peckham
HIS ATTORNEYS Dec. 31, 1957 P. R. WEIHSMANN 2,818,273
MOTOR VEHICLE WITH VARIABLE GROUND CLEARANCE
SUSPENSION SENSITIVE TO SPEED
Filed Aug. 23, 1956 2 Sheets-Sheet 2

INVENTOR.
PETER R. WEIHSMANN
BY
Brown, Critchlow, Flick & Peckham
HIS ATTORNEYS

United States Patent Office 2,818,273
Patented Dec. 31, 1957

2,818,273

MOTOR VEHICLE WITH VARIABLE GROUND CLEARANCE SUSPENSION SENSITIVE TO SPEED

Peter R. Weihsmann, Ridgway, Pa.

Application August 23, 1956, Serial No. 605,744

18 Claims. (Cl. 280—124)

This invention relates to motor vehicles, and more particularly to means for varying the height of their bodies above the ground.

At low speeds, it is desirable for a vehicle to have a soft suspension or spring action in the interests of comfort. A soft suspension requires considerable ground clearance (distance from ground to lowest point on vehicle body) because at low speeds the vehicle may be driven over rough or highly crowned roads, streets or driveways, where it otherwise might drag. At high speeds, however, driving is most likely to be over good, smooth highways where so much clearance is unnecessary. Also, at high speeds, it is desirable to have stiffer suspension to reduce side sway and roll. This makes the ride more comfortable and safer, and the lower the center of gravity the less tendency there will be for the vehicle to overturn and the easier it is to control the vehicle, especially on curves. It has been suggested that safety and comfort at high speed on curves can be improved by providing means for automatically banking the body of the vehicle as it goes around a curve. Such means, however, have not worked out very satisfactorily, one reason being that the vehicle must be well into the curve before the automatic banking starts to become effective, and it may continue in effect too long after leaving the curve, due to inertia of the vehicle body and friction in the control system. I contend that a more practical degree of safety and comfort can be obtained by lowering the center of gravity of the vehicle body at higher speeds without special adjustments at curves. A reduction of only a couple of inches in the ground clearance makes a big difference in the "roadability" of the vehicle, although the exact amount depends on designer's choice and is subject to adjustment. The act of lowering the center of gravity, as executed in my invention, also increases the stiffness of the spring suspension, but of course this must not interfere with the operation of the spring system. To have any practical value, the control of the height of the vehicle body above the ground must be automatic and not depend on manual operations, except for occasional "bad road" operation.

It is among the objects of this invention to provide a motor vehicle in which the stiffness of the body suspension increases with speed, in which the center of gravity becomes lower the higher the speed, in which the foregoing changes can be made to take place automatically and at any desired speed, and in which the body and frame of the vehicle can be raised above their normal height above the ground when desired.

The invention is illustrated in the accompanying drawings, in which:

Fig. 1 is a diagrammatic view of one of my systems for varying the ground clearance of a vehicle body;

Fig. 2 is an enlarged cross-section through one of the torque tubes and torsion rods;

Fig. 3 is an enlarged cross-section through one of the servomotors;

Fig. 9 is a fragmentary elevation, partly in section, of another modification of the invention;

Figure 4:
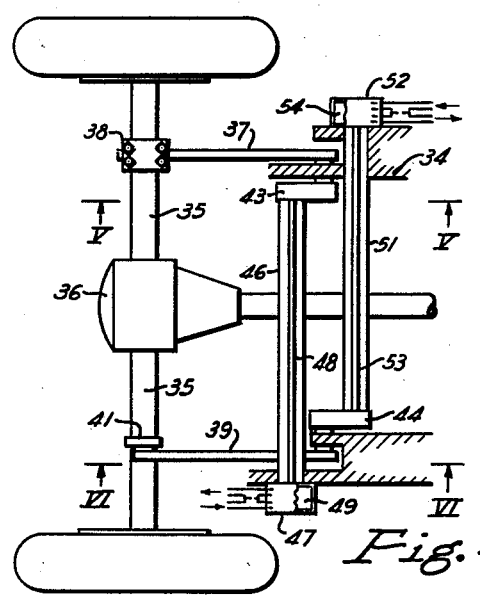
Fig. 4 is a fragmentary diagrammatic view of a modification.

Referring to Figs. 1, 2 and 3 of the drawings, the hatched or shaded areas represent different parts of the body or frame 1 of the motor vehicle, which is supported by the wheels 2. The words "body" and "frame" will be used interchangeably herein, as some bodies are frameless. The front wheels are rotatably mounted on the outer ends of suspension members 3, which may take any conventional form. The inner ends of the suspension members are provided with means for pivotally connecting them to the frame on substantially horizontal axes, as represented in the drawings by the bearings 4. The back wheels are mounted on the outer ends of axles 6, the inner ends of which may be connected by universal joints 7 with a differential 8 rigidly mounted in the frame. The suspension members 9 for the back wheels are shown for illustration only as being the wishbone type having their opposite ends pivotally connected on horizontal axes with the wheels and frame.

While the vehicle is standing still, the body is supported the usual distance above the ground by torque tubes 10 which serve as springs. One end of each tube is rigidly fastened to the adjoining wheel-suspension member coaxially with that member's pivotal connection to the frame. The opposite end of the tube is secured rigidly to the frame. For the body to move vertically relative to the wheels, as when the vehicle strikes a bump, the tubes must twist circumferentially. The twisting and untwisting of the tubes produce a spring action, so that other suspension springs are not necessary.

A feature of this invention is that means are provided for preloading the torque tubes under certain circumstances, and thereby lowering the body, by applying a force that will twist them in the same direction they are twisted when the body descends for other reasons. Accordingly, a torsion rod 11 extends axially through each tube and has one end rigidly secured to the adjoining wheel suspension member. The opposite end of the rod projects out of the tube and is rotatably mounted in the center of a fluid pressure cylinder 12 fastened to the frame and forming the housing of a servomotor. A vane or rotary piston 13 is rigidly mounted on the rod inside housing 12, and normally it preferably is opposite a partition 14 that seals the space between one side of the rod and the side wall of the housing, as shown in Fig. 3. The housing is provided with ports on opposite sides of the partition. With the arrangement shown, if fluid under pressure is delivered through the lower port into the space beneath the piston, the latter will be swung upward and that will turn the torsion rod, which will tend to swing the adjacent wheel upward. Of course, the wheels cannot leave the ground, so the reaction to this force tilts the inner ends of the wheel suspension members downward and thereby lowers the frame against the resistance of the torque tubes, which are twisted by the suspension members as the frame descends. Although the tubes are preloaded in this manner, the preloading is flexible because the torsion rods can twist if the vehicle strikes a bump, so the rods do not prevent the tubes from twisting in either direction. It will be seen that it would be highly undesirable to lower the body by means of rigid members, for they would interfere with normal spring action. In my system, one spring works against another, so proper spring action is maintained although the spring constant is increased as the body is lowered.

As previously indicated herein, it is desirable to lower the body of the vehicle as its speed increases. Therefore, in accordance with this invention, the fluid that is supplied to housings 12 for turning the pistons therein is delivered at a rate that increases with the speed of the vehicle. The higher the speed, the greater the fluid pressure against the pistons and the lower the body will sink between the wheels. The lower housing ports, serving as inlets, are connected by pipes 16 with a branch 17 leading from a four-way valve 18. Liquid is delivered to this valve from a reservoir tank 19 by a positive displacement pump 21 and through an adjustable throttling valve 22. An adjustable pressure relief valve 23 also connects the pump outlet directly with the tank. Fluid leaking past the pistons 13 escapes through the upper ports in the housings and through pipes 24 to a branch 26 that leads to the four-way valve. The valve connects this branch with the tank through a return pipe 27. The pump is driven in any suitable manner at a speed that varies with the speed of the vehicle. For example, it can be driven by the drive shaft through a clutch 28.

If there is no provision for flow of fluid past the pistons, pressure will build up in the servomotors to a maximum almost as soon as the vehicle starts to move, so the body would descend full distance at once. As that would be highly undesirable, provision may be made for diverting some of the fluid so that the vehicle ground clearance will be a function of vehicle speed, as a result of variable pressure built up in the servomotors for turning the pistons therein. Although fluid diversion can be accomplished by providing for predetermined leakage past or through the pistons 13, it is preferred to use a restricted external by-pass that can be conveniently adjusted or easily replaced by one of a different size. Each by-pass can be simply a member 29 provided with an orifice of the right size connected across the pipes 16 and 24 beside a housing 12. These orifices will tend to equalize the leakage rates past the four pistons. The fluid pressure built up in the servomotors will turn the torsion rods and lower the body, until the pressure in the system becomes so great that the relief valve 23 opens and allows the pressure to go no higher. When the vehicle speed is reduced, fluid pressure is bled off through the by-passes and the torque tubes tend to return the body to its normal height above the ground.

In order to delay lowering of the body until a predetermined speed is reached, a spring 30 may be incorporated in valve 22 so that it will not open and allow flow to the servomotors to take place until the vehicle is moving fast enough to cause the pump to overcome the resistance of the valve to opening. To avoid creating a vacuum on the downstream side of this valve in a hydraulic system, it may be preferred to locate the valve in return line 26 or 27.

Valve 18 is not turned unless it is desired to raise the vehicle body above its normal height to increase the normal ground clearance. This may happen when a highly crowned or deeply rutted road is being traveled, or when a tire is to be changed. In such cases the valve is turned to reverse the flow of the fluid at the servomotors, so the torsion rods 11 will be turned in the opposite direction and the body will rise instead of descending. However, since raising of the body is most likely to be desired at slow speeds or while the vehicle is standing still, provision should be made for driving pump 21 at such times by an auxiliary source of power having sufficient speed to build up the necessary fluid pressure in the servomotors to a value near the setting of relief valve 23, regardless of the speed or movement of the vehicle. Such a source of power can be the vehicle engine driving through suitable gearing, or it may be the starter motor. In the latter case, drain on the battery will not be excessive because the fluid pressure generally has to be maintained only for a short period. A suitable clutch 31 can be used for connecting the pump to the auxiliary drive after clutch 28 has been disengaged. In actual practice, both clutches may be combined in a single unit, and they may be actuated automatically when valve 18 is reversed.

Pneumatic pressure can be substituted for hydraulic pressure if desired, especially if the body-raising feature is not wanted. In the latter case the reservoir 19 and the pipes returning to it can be eliminated, because the compressed air in the system can be discharged directly to atmosphere.

Figures 5, 6:
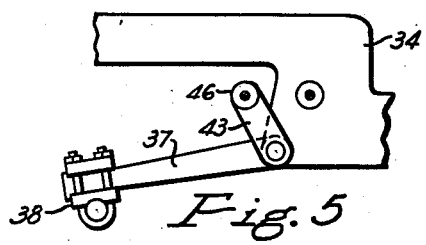
Figs. 5 and 6 are fragmentary vertical cross-sections taken on the lines V—V and VI—VI, respectively, of Fig. 4.

Fig. 4 of the drawings shows an application of the torque tubes and torsion rods transversely of the rear end of the vehicle frame 34 instead of lengthwise thereof. The front end of the body can be lowered in the manner shown in Fig. 1. In this modification the rear axle housings 35 are connected rigidly to the differential housing 36 and are fastened to the rear ends of a pair of parallel arms that have a little lateral and torsional flexibility. One of the arms 37 is secured to an axle housing by a clamp 38, but the other arm 39 is pivotally connected to the other axle housing through a bracket 41 rigidly mounted on the housing. Preferably, as shown in Fig. 6, link 42 parallel to arm 39 has its end pivoted to the bottom of the bracket and the frame. The front ends of both arms are shaped like bell cranks and are pivotally mounted in the frame on a common transverse axis. The short lever 43 at the front end of arm 37 extends upward and backward (Fig. 5), while the corresponding lever 44 of the other arm is inclined forward (Fig. 6).

Rigidly connected to the side of the upper end of lever 43 is a torque tube 46, the opposite end of which is fastened to a servomotor housing 47 welded to the outside of the frame. Extending axially through the tube is a torsion rod 48, attached at one end to the lever and at its opposite end to a rotary piston 49 in the housing. A second torque tube 51, parallel to the first, has one end secured to the upper part of the other lever 44 and its outer end attached to a servomotor housing 52 secured to the frame. The tube contains a torsion rod 53 which extends into the housing and carries a piston 54. The two tubes serve as springs which normally hold the bell cranks in predetermined positions to hold the body a certain distance above the ground.

The two servomotors may be connected in the same kind of fluid circuit shown in Fig. 1. The fluid pressure in their housings turns the pistons therein, which cause the torsion rods to exert a turning force on the levers that swings the levers forward. This action tends to lift the wheels, with the result that the vehicle body is lowered.

Figure 8:
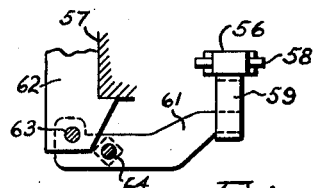
Fig. 8 is an enlarged fragmentary vertical section taken on the line VIII—VIII of Fig. 7.
Figure 7:
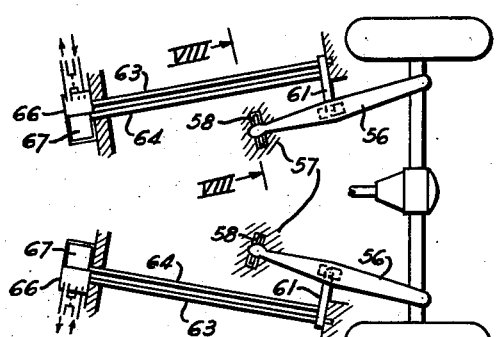
Fig. 7 is a fragmentary diagrammatic view of another embodiment of the invention.

In the modification shown in Figs. 7 and 8 the rear axle housings likewise are connected to the rear ends of a pair of arms 56, the front ends of which are pivotally connected to the vehicle frame 57 on substantially horizontal axes at 58. As shown in Fig. 8, a stirrup 59 is fastened to the bottom of each arm about halfway between its ends. Mounted in each stirrup is the inner end of a lever 61, the outer end of which is pivotally mounted in a bracket 62 forming part of the frame. The body is held the proper normal distance above the ground by torque rods 63 rigidly secured to the frame and to the levers coaxially of their pivots. The tendency of the rods to untwist causes the inner end of the levers to press down in the stirrups, whereby the outer ends of the levers hold up the frame. Parallel to each torque rod there is a torsion rod 64 secured to the adjoining lever and extending into a servomotor housing 66 secured to the frame.

A rotary piston 67, rigidly mounted on the torsion rod in the housing, is turned by fluid pressure beneath it to cause the rod to lower the outer end of the lever and thereby lower the body.

The embodiment of the invention shown in Fig. 9 makes use of a coil spring 70 instead of a torque tube. The spring is compressed between a support 71 on the vehicle frame 72 and the bottom link 73 of the wheel suspension to hold the body at the desired normal elevation. Rigidly mounted in support 71 is a fluid pressure housing or cylinder 74, in which a piston 76 is mounted on the upper end of a piston rod 77. The lower end of the rod is pivotally connected to link 73. Pressure fluid is delivered to the lower part of the cylinder through a pipe 78, and when the pressure in the cylinder lowers the cylinder relative to the piston, the body will be lowered. Leakage past the piston is controlled by orifice 79. It is contemplated that air pressure will be used with the specific arrangement shown, because hydraulic fluid beneath the piston would prevent upward movement of the body when bumps are encountered, so spring action would be in only one direction.

Figure 10:
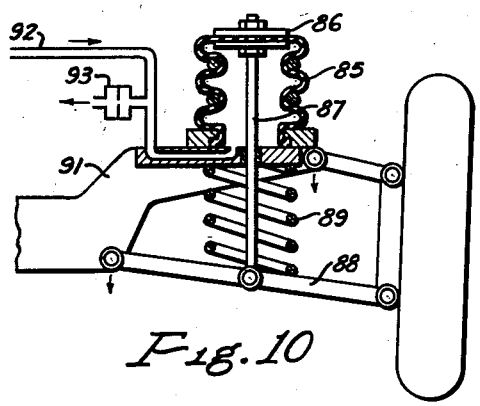
Fig. 10 is a view similar to Fig. 9 of a still further embodiment.
Figure 11:
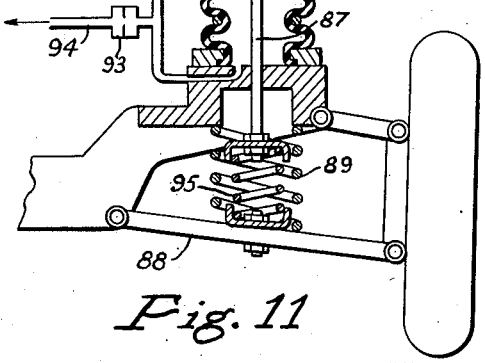
Fig. 11 is a view like Fig. 10 of another embodiment of the invention.

The construction shown in Fig. 10 is similar to what is shown in Fig. 9, except that the cylinder 85 is flexible longitudinally and the piston 86 is rigidly connected to the upper end of the cylinder. The lower end of the piston rod 87 is pivoted to wheel suspension link 88, and a coil spring 89 is compressed between that link and the top of the vehicle frame 91. Only one pipe 92 is connected to the cylinder, and this pipe is provided with a fluid diverter 93 shown discharging to atmosphere. Compressed air delivered to the flexible cylinder will expand it lengthwise and thereby lower the body after the vehicle gets up to speed. If hydraulic fluid is used, diverter 93 should be connected to a pipe 94 returning to the fluid reservoir, as shown in Fig. 11, and the piston rod 87 should be connected to the wheel suspension link 88 through a spring 95.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for automatically varying the height of a vehicle frame relative to its wheels, said apparatus comprising suspension means for the wheels, spring members secured to the frame and operatively connected with the suspension means to normally support the frame a predetermined distance above the ground, fluid pressure responsive means for preloading flexibly said spring members, and a pump adapted to be driven by said vehicle for delivering fluid to said preloading means at a rate increasing with the speed of the vehicle to lower said frame against the increasing resistance of said spring members as said speed increases.

2. Apparatus according to claim 1, including a relief valve adapted to open when said fluid reaches a predetermined pressure, whereby to limit said lowering of the vehicle.

3. Apparatus according to claim 1, including means for adjusting the rate of flow of said fluid from said pump to said preloading means.

4. Apparatus according to claim 1, including a spring-loaded valve for delaying flow of said fluid to the preloading means until the vehicle reaches a predetermined speed.

5. Apparatus according to claim 1, in which said preloading means is provided with a fluid diversion opening.

6. Apparatus according to claim 1, in which said spring members are elongated torque members.

7. Apparatus for automatically varying the height of a vehicle frame relative to its wheels, said apparatus comprising suspension means for the wheels, spring members secured to the frame and operatively connected with the suspension means to normally support the frame a predetermined distance above the ground, a rod connected at one end with the suspension means for each wheel, a piston secured to the opposite end of each rod, fluid pressure housings containing the pistons and secured to the frame, means for pumping fluid into said housings at a rate increasing with the speed of the vehicle to exert pressure against the pistons in a direction to preload said spring members and lower the frame, and means for delaying build up of fluid pressure against the pistons.

8. Apparatus for automatically varying the height of a vehicle frame relative to its wheels, said apparatus comprising suspension means for the wheels, spring members secured to the frame and operatively connected with the suspension means to normally support the frame a predetermined distance above the ground, a rod connected at one end with the suspension means for each wheel, fluid pressure housings slidably receiving the rods and secured to the frame, pistons mounted on the rods inside the housings, and means for pumping fluid into the housings at a rate increasing with the speed of the vehicle to exert pressure against the pistons axially thereof in a direction to lower the frame by preloading said spring members.

9. Apparatus for automatically varying the height of a vehicle frame relative to its wheels, said apparatus comprising suspension means for the wheels, spring members secured to the frame and operatively connected with the suspension means to normally support the frame a predetermined distance above the ground, a rod connected at one end with the suspension means for each wheel, fluid pressure housings secured to the frame and rotatably receiving the rods, a piston projecting radially from the rod inside each housing, and means for pumping fluid into said housings at a rate increasing with the speed of the vehicle to turn the pistons and rods in a direction to lower the frame against the increasing resistance of said spring members.

10. Apparatus for automatically varying the height of a vehicle frame relative to its wheels, said apparatus comprising suspension means for the wheels, spring members secured to the frame and operatively connected with the suspension means to normally support the frame a predetermined distance above the ground, a rod connected at one end with the suspension means for each wheel, fluid pressure cylinders secured to the frame, each rod extending into one end of a cylinder and being reciprocable therein, a piston rigidly mounted on the rod inside each cylinder, means for pumping fluid into said cylinders at a rate increasing with the speed of the vehicle to exert pressure against the pistons axially thereof in a direction to lower the frame, and means for diverting some of the fluid.

11. Apparatus for automatically varying the height of a vehicle frame relative to its wheels, said apparatus comprising suspension means for the wheels, spring members secured to the frame and operatively connected with the suspension means to normally support the frame a predetermined distance above the ground, a rod connected at one end with the suspension means for each wheel, axially expansible housings secured at one end to the frame, each rod extending into said end of a housing, a piston rigidly mounted on the rod inside each housing and secured to the opposite end of the housing, and means for pumping fluid into said housings at a rate increasing with the speed of the vehicle to expand them to lower the frame.

12. Apparatus for automatically varying the height of a vehicle frame relative to its wheels, said apparatus comprising suspension means for the wheels, elongated torque members rigidly secured at their opposite ends to the frame and suspension means to normally support the frame a predetermined distance above the ground, a torsion rod extending lengthwise of each torque member and having one end rigidly connected to the adjoining wheels suspension means, a piston projecting radially from the opposite end of each rod, a fluid pressure housing containing the piston and secured to the frame, the piston and rod being rotatable in said housing, and means for pumping fluid into the housings at a rate increasing with the speed of the vehicle to twist the rods in a direction to preload the torque members and lower the frame.

13. Apparatus for automatically varying the height of a vehicle frame relative to its wheels, said apparatus comprising suspension means for the wheels, torque tubes rigidly secured at their opposite ends to the frame and suspension means to normally support the frame a predetermined distance above the ground, a torsion rod extending through each tube axially thereof and having one end rigidly connected to the adjoining wheel suspension means, a piston projecting radially from the opposite end of each rod, a fluid pressure housing containing the piston and secured to the frame, the pistons and rods being rotatable in the housings, and means for pumping fluid into the housings at a rate increasing with the speed of the vehicle to twist the rods in a direction to turn the torque tubes and lower the frame.

14. Apparatus for automatically varying the height of a vehicle frame relative to the wheels supporting it, said apparatus comprising tiltable suspension means for each wheel, means pivotally connecting the inner ends of said means to the frame on substantially horizontal axes, spring members secured to the frame and operatively connected with the suspension means for urging the outer ends of said means downward to normally support the frame a predetermined distance above the ground, a rod connected at one end with the suspension means for each wheel, a piston secured to the opposite end of the rod, fluid pressure housings containing the pistons and secured to the frame, means for pumping fluid into the housings at a rate increasing with the speed of the vehicle to exert pressure against the pistons in a direction to tilt the inner ends of said suspension means downward against the resistance of said spring members, whereby to lower said frame, and means for diverting some of the fluid.

15. Apparatus for automatically varying the height of a vehicle frame relative to the wheels supporting it, said apparatus comprising tiltable suspension means for each wheel, means pivotally connecting the inner ends of said means to the frame on substantially horizontally axes, elongated torque members secured at their opposite ends to the frame and suspension means for urging the outer ends of said means downward to normally support the frame a predetermined distance above the ground, a torsion rod extending lengthwise of each torque member and having one end rigidly connected to the adjoining wheel suspension means, a piston projecting radially from the opposite end of each rod, fluid pressure housings containing the pistons and secured to the frame, and means for pumping fluid into the housings at a rate increasing with the speed of the vehicle to exert pressure against the pistons in a direction to tilt the inner ends of said suspension means downward against the resistance of said torque members, whereby to lower said frame, and means for diverting some of the fluid.

16. Apparatus for automatically varying the height of a vehicle frame relative to the wheels supporting it, said apparatus comprising tiltable arms supported at their outer ends by the wheels, the arms extending lengthwise of the frame, means pivotally connecting the inner ends of said arms to the frame on substantially horizontal axes, a lever flexibly connected at one end to the central portion of each arm and extending laterally therefrom, means pivotally connecting the outer ends of the levers to the frame, elongated torque members secured at their opposite ends to the frame and outer ends of the levers and twisted in a direction to urge the arm ends of the levers downward to cause the arms to normally support the frame a predetermined distance above the ground, a torsion rod extending lengthwise of each torque member and having one end rigidly connected to the adjoining lever, a piston projecting radially from the opposite end of each rod, fluid pressure housings containing the pistons and secured to the frame, and means for pumping fluid into the housings at a rate increasing with the speed of the vehicle to exert pressure against the pistons in a direction to tilt the pivoted ends of said levers downward against the resistance of said torque members, whereby to lower said frame.

17. Apparatus for automatically varying the height of a vehicle frame relative to its wheels, said apparatus comprising a rear axle, a pair of parallel arms supported at their rear ends by the axle, frame-supporting members rigidly connected to the front ends of the arms and pivotally connected to the frame on horizontal axes, levers rigidly connected to said members and projecting radially therefrom, a pair of parallel torque tubes extending transversely of the frame, each tube being rigidly connected at one end to the outer end of one of said levers, the opposite end of each tube being rigidly connected to the frame to normally support the frame a predetermined distance above the ground, a torsion rod extending through each tube axially thereof and having one end rigidly connected to the adjoining lever, a piston projecting radially from the opposite end of each rod, a fluid pressure housing containing the piston and secured to the frame, the pistons and rods being rotatable in the housings, and means for pumping fluid into the housings at a rate increasing with the speed of the vehicle to twist the rods in order to swing said levers in a direction to lower the back of the frame.

18. Apparatus for automatically varying the height of a vehicle frame relative to its wheels, said apparatus comprising suspension means for the wheels, spring members secured to the frame and operatively connected with the suspension means to normally support the frame a predetermined distance above the ground, a rod connected at one end with the suspension means for each wheel, a piston secured to the opposite end of each rod, fluid pressure housings containing the pistons and secured to the frame, a pump, fluid conduits connecting the pump with each housing at opposite sides of the piston therein, said pump being adapted to be operated by the vehicle at a rate increasing with the speed of the vehicle to exert fluid pressure against said pistons in a direction to preload said spring members to lower the frame, and a reversing valve in said conduits to shift said pressure to the opposite side of the pistons to raise the frame.

References Cited in the file of this patent
FOREIGN PATENTS 741,899     Great Britain _____ Dec. 14, 1955